(12) United States Patent
Li

(10) Patent No.: US 11,477,323 B2
(45) Date of Patent: Oct. 18, 2022

(54) MANAGING QUEUED VOICE CALLS

(71) Applicant: Telefonaktiebolaget LM Ericsson (publ), Stockholm (SE)

(72) Inventor: Xiaoping Li, Karlskrona (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/414,533

(22) PCT Filed: Dec. 19, 2018

(86) PCT No.: PCT/EP2018/085888
§ 371 (c)(1),
(2) Date: Jun. 16, 2021

(87) PCT Pub. No.: WO2020/125971
PCT Pub. Date: Jun. 25, 2020

(65) Prior Publication Data
US 2022/0046133 A1    Feb. 10, 2022

(51) Int. Cl.
*H04M 3/523* (2006.01)
*H04M 1/72409* (2021.01)

(52) U.S. Cl.
CPC ..... *H04M 3/5238* (2013.01); *H04M 1/72409* (2021.01)

(58) Field of Classification Search
CPC .. H04M 1/247; H04M 1/72409; H04M 1/725; H04M 1/72519; H04M 1/80; H04M 1/82; H04M 3/428; H04M 3/4285; H04M 3/4286; H04M 3/51; H04M 3/5166; H04M 3/5233; H04M 3/5232; H04M 3/5238; H04M 2201/18; H04M 2201/40; H04M 2250/74

(Continued)

(56) References Cited

U.S. PATENT DOCUMENTS 6,996,603 B1 * 2/2006 Srinivasan ............... H04L 67/36
709/204
2003/0108187 A1 * 6/2003 Brown ................... H04M 3/523
379/266.03

(Continued)

FOREIGN PATENT DOCUMENTS

WO   WO 2017/186271 A1   11/2017

OTHER PUBLICATIONS

International Search Report and Written Opinion of the International Searching Authority, PCT/EP2018/085888, dated May 22, 2019, 8 pages.

*Primary Examiner* — Harry S Hong
(74) *Attorney, Agent, or Firm* — Sage Patent Group

(57) ABSTRACT

The present disclosure relates to a method of managing a voice call having been queued to await a response by a human representative of a call centre, and a device performing the method. In an aspect, a method is provided of managing a voice call having been queued to await a response by a human representative of a recipient of the voice call, the method being performed by a communications device of a calling party and which includes detecting, from a voice indication provided by the recipient, information indicating a current position of the voice call in the queue, and displaying the detected information indicating a current position of the voice call in the queue.

16 Claims, 4 Drawing Sheets

(58) Field of Classification Search
USPC .................................................. 379/266.06
See application file for complete search history.

(56) References Cited

U.S. PATENT DOCUMENTS

2010/0303227 A1   12/2010  Gupta
2017/0054849 A1*   2/2017  Torre .................. H04M 3/5141
2017/0346948 A1*  11/2017  Wolf .................. H04M 3/5238

* cited by examiner

MANAGING QUEUED VOICE CALLS

CROSS REFERENCE TO RELATED APPLICATIONS

This application is a 35 U.S.C. § 371 national stage application of PCT International Application No. PCT/EP2018/085888 filed on Dec. 19, 2018, the disclosure and content of which is incorporated by reference herein in its entirety.

TECHNICAL FIELD

The present disclosure relates to a method of managing a voice call having been queued to await a response by a human representative of a recipient of the voice call, a corresponding computer program, a corresponding computer program product, and a communications device configured to manage a voice call by a calling party having been queued to await a response by a human representative of a recipient of the voice call.

BACKGROUND

Nowadays, many companies provide customer service via voice calls and commonly the customer is placed in a queue and informed about his/her place in the queue and how long the expected wait will be until the call is switched from the answering machine to a human representative responding to the call. In the meantime, the customer can only listen to the music or audio recording provided by the call centre and wait in the queue until the representative picks up the call. Alternatively, the customer can choose another option to leave his/her own telephone number so that a representative of the call centre can call back later.

According to survey, most customers expect a representative to answer a call within five minutes, but in reality it is not uncommon that it takes much longer due to long queues, for instance half an hour or even up to an hour of wait can sometimes be experienced before being connected to a representative. Although the customer can leave the call user interface (UI) of a communications device via which the call is made, such as a smartphone, a tablet or a computer, and work on other tasks, he/she still needs to listen to the voice call to monitor the dynamic change of his/her place in the queue. Further, the audio from the communications device is distracting, but if the customer lowers the audio he/she is at risk of missing the place in the queue.

Even if the customer chooses the other option and requests the company to call back, it may take one or more days for the company to call back, or they may call the customer at an unsuitable time when he/she is not available to answer the call.

SUMMARY

An object is to solve, or at least mitigate, this problem in the art and thus to provide an improved method of managing a voice call having been queued to await a response by a human representative of a recipient of the voice call.

This object is attained in a first aspect by a method of managing a voice call having been queued to await a response by a human representative of a recipient of the voice call. The method is performed by a communications device of a calling party and comprises detecting, from a voice indication provided by the recipient, information indicating a current position of the voice call in the queue, and displaying the detected information indicating a current position of the voice call in the queue.

This object is attained in a second aspect by a communications device configured to manage a voice call by a calling party having been queued to await a response by a human representative of a recipient of the voice call. The communications device comprises a processing unit and a memory, which memory contains instructions executable by the processing unit, whereby the communications device is operative to detect, from a voice indication provided by the recipient, information indicating a current position of the voice call in the queue, and display the detected information indicating a current position of the voice call in the queue.

Hence, a (human) calling party, i.e., a user of a communications device, wishes to place a voice call with for instance a support function of her bank, which support function may be embodied by a call centre. The user thus uses an appropriate communications device, in this particular example her smartphone, to place the voice call with the call centre.

Upon being connected to the call centre, a computer implementing a telephone exchange will activate an answering machine which replies to the user via the smartphone that the user has been placed in a call queue.

Typically, the reply will indicate the user's position in the queue ("your place in the queue is 23") and additionally or alternatively also time remaining until a human representative of the call centre is expected to respond to the queued call ("we will answer your call within approximately 14 minutes"). To wait by the phone to listen to the answering machine repeatedly informing about a current place in the queue is oftentimes experienced as a tedious process.

In an aspect, the smartphone will detect, from the queue information provided by the answering machine of the computer over the voice call, the users' place in the queue. Subsequently, the smartphone will display the detected queue information on the screen of the phone, or even on some other appropriate device such as a television screen or a laptop screen of the user, thereby enabling visual presentation of the queue information to the user.

Advantageously, the user is not required to listen to the audio coming from the smartphone informing the user about her place in the queue. Rather, the user can occasionally throw an eye at the screen of the phone to receive an update of her place in the queue.

In an embodiment, a listening volume of the communications device is decreasing, possibly to a mute, upon detecting that the voice call has been queued. Advantageously, the user is not distracted by the voice call when working with other tasks during the queuing.

In an embodiment, it is determined whether the detected information indicating a current position of the voice call in the queue indicates that a queue threshold condition is satisfied or not, and if so the calling party is notified. For instance, the smartphone notifies the user when a queue threshold condition is satisfied, such as when the current position has decreased to a queue position threshold value. For example, the user is notified when the call has position "1" in the queue and thus is the next call to be responded to by the human representative. Hence, after possibly having muted the voice call, the smartphone will continuously compare the detected most current queue position with the queue threshold, and as soon as the threshold is reached (in this example when the voice call is placed first in the queue, i.e. the threshold value is set to "1"), the smartphone will notify the user. This notification may be embodied for instance by an audial alert, a vibration or by briefly flashing a flashlight of the phone, thereby making the user—who may be occupied with performing some other task—aware that the call centre representative is about to respond to the call.

In an embodiment the listening volume of the communications device is increased, when the user is notified that the human representative is expected to respond within short.

In an embodiment, the information indicating a queue position indicates an actual current position of the voice call in the queue ("your place in the queue is 23").

In an embodiment, the information indicating a queue position indicates a remaining time until the response by the human representative can be expected ("we will answer your call within approximately 14 minutes").

In an embodiment, the queue threshold condition is considered to be satisfied if the actual current position has decreased to a queue position threshold value.

In an embodiment, the queue threshold condition is considered to be satisfied if the remaining time until the response by the human representative can be expected has decreased to a queue time threshold value.

In an embodiment, the detection of information from a voice indication comprises recognizing a non-human voice indication.

In a third aspect, a computer program is provided comprising computer-executable instructions for causing a communications device to perform steps of the method according to the first aspect when the computer-executable instructions are executed on a processing unit included in the communications device.

In a fourth aspect, a computer program product is provided comprising a computer readable medium, the computer readable medium having the computer program according to the third aspect embodied thereon.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments of the invention are shown.

These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
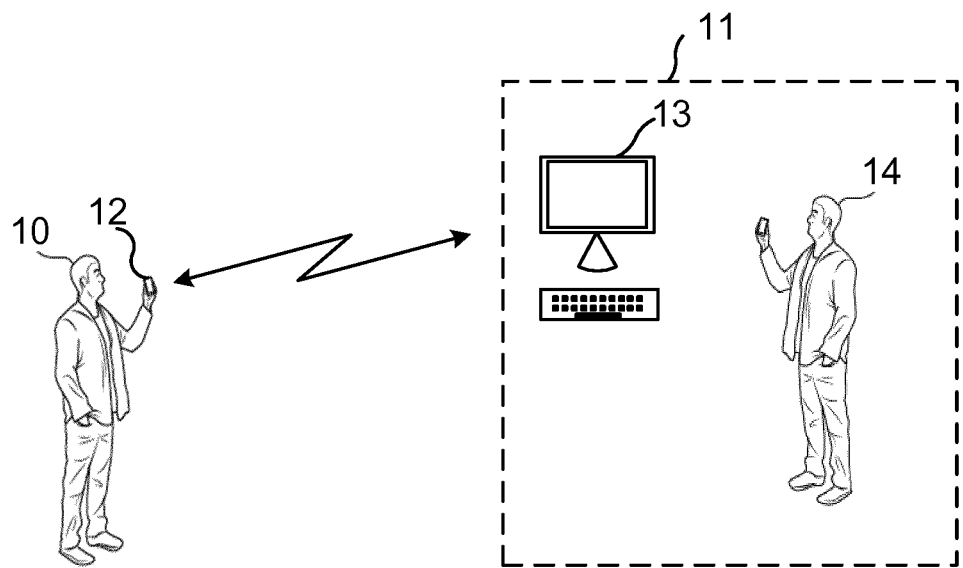
FIG. 1 illustrates a communications device configured to manage a voice call having been queued to await a response by a human representative of a call centre, in accordance with embodiments of the invention.

FIG. 1 illustrates a communications device configured to manage a voice call having been queued to await a response by a human representative of a recipient of the voice call. In the following, the recipient will be exemplified in the form of a call centre, but other types of recipients are envisaged such as an individual to which the voice call is made.

Figure 2:
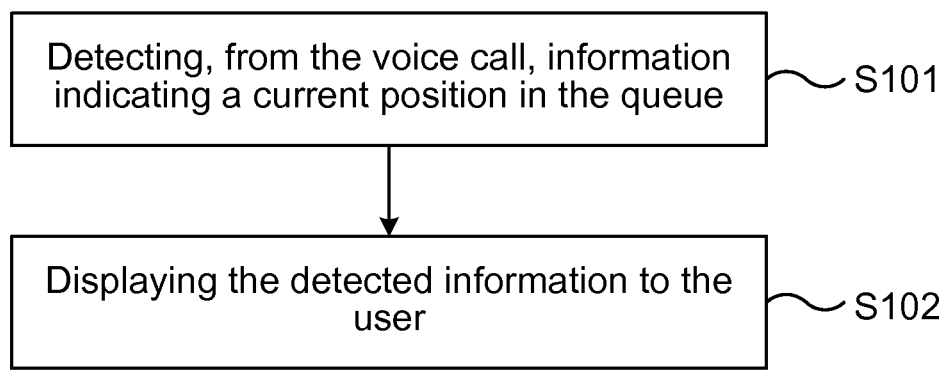
FIG. 2 shows a flowchart illustrating a method performed by the communications device of FIG. 1 according to an embodiment of the invention.

FIG. 2 shows a flowchart illustrating a method performed by the communications device of FIG. 1 of managing a voice call having been queued to await a response by a human representative of a call centre according to an embodiment of the invention.

An embodiment of the invention will now be described with reference to FIGS. 1 and 2.

A calling party 10 (in the following being referred to as a user, i.e., a human) wishes to place a voice call with, e.g., a support function of her bank, which support function is embodied by a call centre 11. The user 10 thus uses an appropriate communications device, in this particular example her smartphone 12, to place the voice call with the call centre 11. The call may be a regular phone call or a Voice over Internet Protocol (VoIP) call using, e.g., Skype.

Upon being connected to the call centre, a computer 13 implementing a telephone exchange will activate an answering machine which replies to the user 10 via the smartphone 12 that the user 10 has been placed in a call queue. As is understood the voice indication from the call centre 11 is provided by means of a synthesized voice, i.e., a computer-generated voice.

Typically, the reply will indicate the user's position in the queue ("your place in the queue is 23") and additionally or alternatively also time remaining until a human representative 14 of the call centre 11 is expected to respond to the queued call ("we will answer your call within approximately 14 minutes").

A number of variants are possible when presenting the position, such as a) position: the caller hears, "your position in queue is [six]", b) ordinal position: the caller hears, "you are the [sixth] caller in the queue", or c) ahead: the caller hears, "there are [five] callers ahead of you", etc.

Now as previously has been discussed, to wait by the phone to listen to the answering machine repeatedly informing about a current place in the queue is a tedious process.

In this embodiment, the smartphone 12 will detect in step S101, from the queue information provided by the answering machine of the computer 13 over the voice call, the users' place in the queue. This may be achieved using an appropriate audio recognition application, such as for instance Apple's Siri voice recognition service, and further modifying or customizing the Siri voice recognition service using for instance Apple's development software SiriKit, which enables iOS apps and watchOS apps to work with Ski. Alternatively, in case of Android, similar audio recognition services may be utilized such as Google's Google Assistant or Samsung's Bixby.

Subsequently, in step S102, the smartphone 12 will display the detected queue information on the screen of the phone 12, thereby enabling visual presentation of the queue information to the user 10.

Advantageously, the user 10 is not required to listen to the audio from the smartphone 12 informing the user 10 about her place in the queue. Rather, the user can occasionally throw an eye at the screen of the phone 12 to receive an update of her place in the queue.

Figure 3:
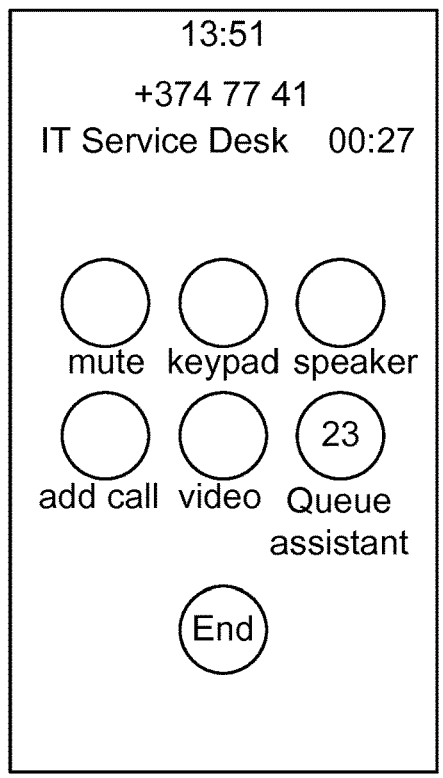
FIG. 3 illustrates an example of a UI of a smartphone enabling a queue assistant mode according to an embodiment of the invention.

FIG. 3 illustrates an example of a UI provided by a touchscreen of the smartphone 12 placing a call with the call centre 11 (denoted "IT Service Desk" on the UI). In FIG. 3, the UI comprises a "Queue assistant" icon which when touched by the user 10 instructs the smartphone 12 to detect the queue information provided by the computer 13 of the call centre 11 and display the detected information to the user 10 according to an embodiment.

It should be noted that the smartphone 12 alternatively may enter queue assistant mode automatically as soon as the phone 12 detects that the voice call has been placed in a queue. For instance, immediately after recognizing the audio "your place in the queue is . . . " the smartphone 12 automatically triggers the queue assistant mode due to key words being recognized. This can be detected by a virtual assistant such as Siri, or by Advanced Answering Machine Detection (AAMD) technologies with machine learning algorithms, speech recognition, or other similar technologies.

It may be envisaged that no detailed queue information is provided ("we will answer your call as soon as we can") by the call centre 11, in which case is will not be possible to display any useful queue information.

Figure 4:
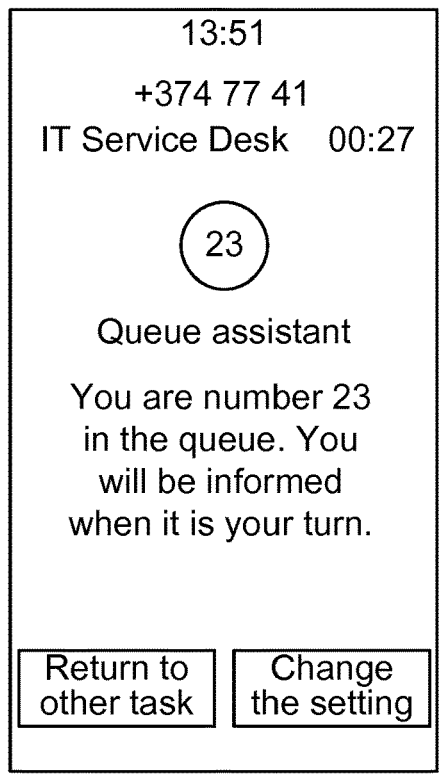
FIG. 4 illustrates how actual current position of a voice call in a queue is displayed to a user on a UI of a smartphone according to an embodiment of the invention.

FIG. 4 illustrates an example of how the actual current position ("23") of the voice call in the queue is displayed to the user 10 on the UI of the smartphone 12 according to an embodiment. The user 10 may select to return to some other task with which she was occupied before placing the voice call with the call centre 11, such as reading a news paper or playing a game, by touching a "Return to other task" icon, or could change a setting of the queue assistant by touching "Change the setting".

Figure 5:
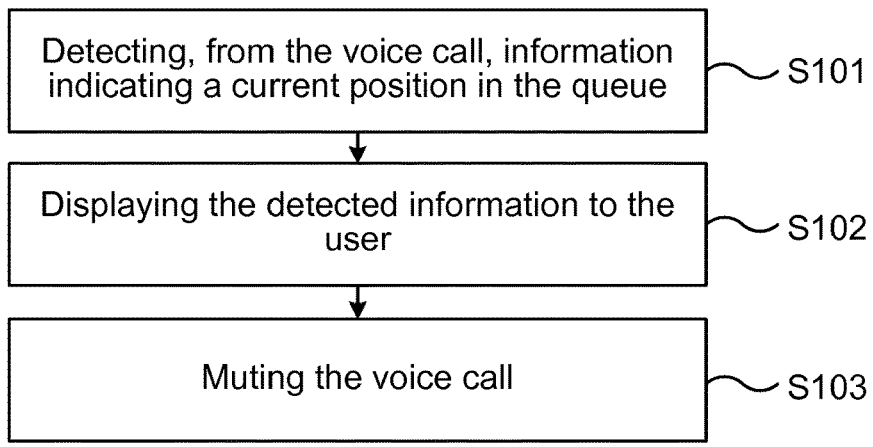
FIG. 5 shows a flowchart illustrating a method performed by the communications device of FIG. 1 according to another embodiment of the invention.

For instance, in an embodiment, the user 10 may select a setting where a listening volume of the smartphone 12 is decreased, even down to zero listening volume thereby muting the voice call, as long as the call is queued in order to avoid distraction when working with other tasks during the queuing, or the smartphone 12 may itself automatically decrease the listening volume or mute the voice call upon entering queue assistant mode, as illustrated in step S103 of FIG. 5. It may further be envisaged that the voice call towards the call centre 11 is muted, should the user 10 be in a further voice call with another party.

Figure 6:
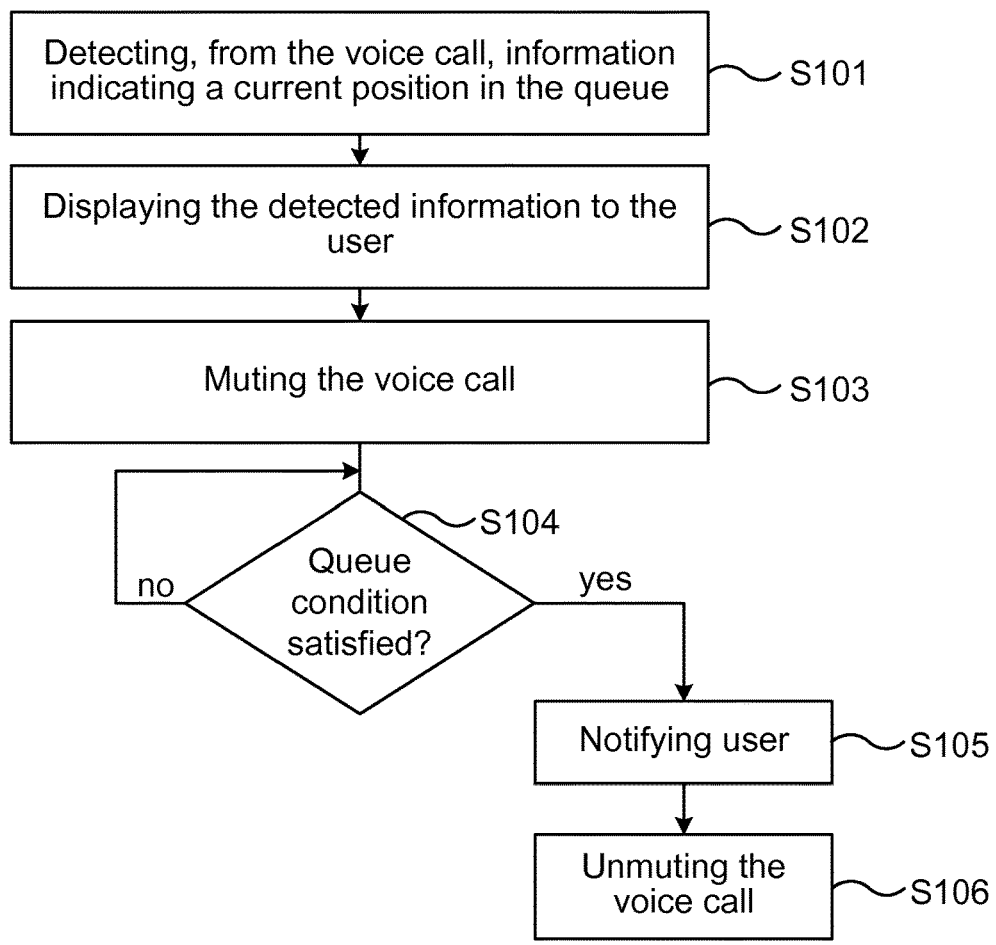
FIG. 6 shows a flowchart illustrating a method performed by the communications device of FIG. 1 according to yet another embodiment of the invention.

With reference to FIG. 6, in an embodiment, the smartphone 12 notifies the user 10 when a queue threshold condition is satisfied, such as when the current position has decreased to a queue position threshold value. For example, the user 10 is notified when the call has position "1" in the queue and thus is the next call to be responded to by the human representative. Hence, after optionally having muted the voice call in step S103, the smartphone 12 will continuously compare the detected most current queue position with the queue threshold in step S104, and as soon as the threshold is reached (in this example when the voice call is placed first in the queue, i.e. the threshold value is set to "1"), the smartphone 12 will notify the user 10 in step S105.

This notification may be embodied for instance by an audible alert, a vibration, a visual alert on the screen, or by briefly flashing a flashlight of the phone, thereby making the user 10—who may be occupied with performing some other task—aware that the call centre representative 14 is about to respond to the call. It is envisaged that the user 10 is allowed to select means of notification herself by touching the "Change the setting" icon and then make a preferred selection, and further to set the queue threshold to a desired value such as "2" or even recognize instantly when the human representative 14 responds to the voice call. It may further be envisaged that a wearable device worn by the user 10, such as a smartwatch, may be used for notifying the user 10. For instance, a smartwatch worn by the user may, upon receipt of a signal from the communications device 12 via a short-range radio connection like Bluetooth, by an audible alert, a vibration, or a visual alter on a screen of the smartwatch.

Further with reference to FIG. 6, in an embodiment the muted voice call is unmuted in step S106 when the user 10 is notified that the human representative 14 is expected to respond within short. The unmuting of the voice call may serve as a notification in itself in step S105 (in which case step S106 is omitted). However, it is also envisaged that, e.g., a vibration notifies the user 10 in step S105, which vibration is followed by the unmuting the call in step S106.

In a further embodiment, if the call centre 11 provides information indicating a remaining time until the response by the human representative can be expected, the queue threshold condition is considered to be satisfied when the remaining time until the response by the human representative 14 can be expected has decreased to a queue time threshold value, for instance when one minute remains until the representative 14 is expected to respond.

Figure 7:
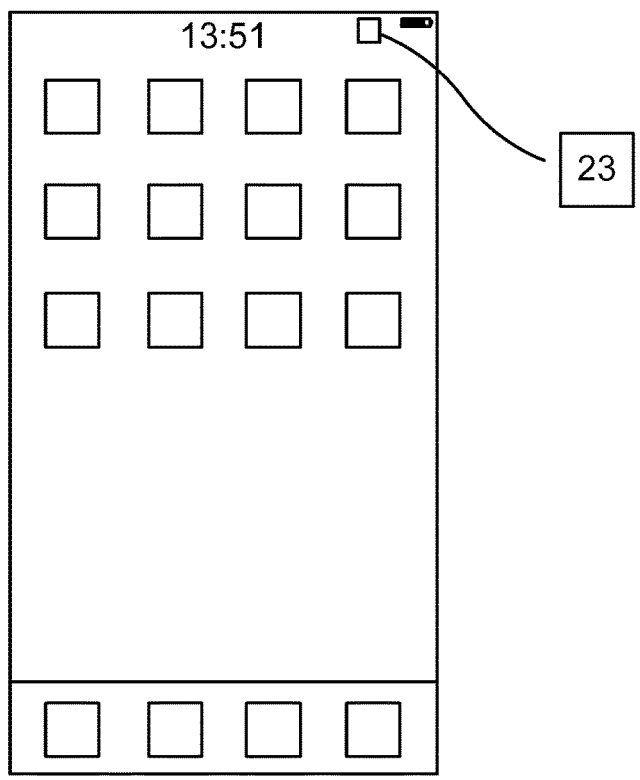
FIG. 7 illustrates an example of a UI of a smartphone when a user leaves the UI voice call view illustrated in FIGS. 3 and 4, according to an embodiment of the invention.

FIG. 7 illustrates an example of an appearance of the UI when the user 10 leaves the UI voice call view illustrated in FIGS. 3 and 4 according to an embodiment. Hence, the user 10 may return e.g. to the home screen while the current queue position "23" still is displayed in the top right corner of the screen, or any other appropriate location on the screen.

Figure 8:
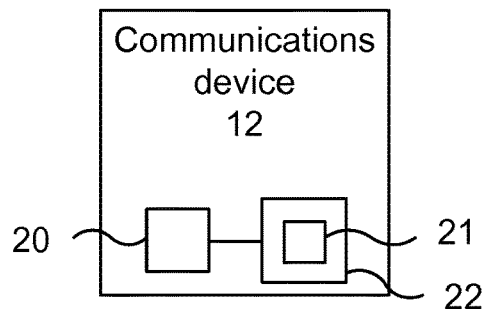
FIG. 8 illustrates a communications device according to an embodiment of the invention.

FIG. 8 illustrates a communications device 12 according to an embodiment of the invention, the device being for instance a smartphone, a computer, a tablet, a smartwatch, or a networked vehicle such as a car with capability to establish a wireless connection, etc.

With reference to FIG. 8, the steps of the method performed by the communications device 12 of managing a voice call having been queued to await a response by a human representative of a call centre according to embodiments are in practice performed by a processing unit 20 embodied in the form of one or more microprocessors arranged to execute a computer program 21 downloaded to a suitable storage medium 22 associated with the microprocessor, such as a Random Access Memory (RAM), a Flash memory or a hard disk drive. The processing unit 20 is arranged to cause the communications device 12 to carry out the method according to embodiments when the appropriate computer program 21 comprising computer-executable instructions is downloaded to the storage medium 22, e.g., a non-transitory storage medium, and executed by the processing unit 20. The storage medium 22 may also be a computer program product comprising the computer program 21. Alternatively, the computer program 21 may be transferred to the storage medium 22 by means of a suitable computer program product, such as a Digital Versatile Disc (DVD) or a memory stick. As a further alternative, the computer program 21 may be downloaded to the storage medium 22 over a network. The processing unit 20 may alternatively be embodied in the form of a digital signal processor (DSP), an application specific integrated circuit (ASIC), a field-programmable gate array (FPGA), a complex programmable logic device (CPLD), etc.

Figure 9:
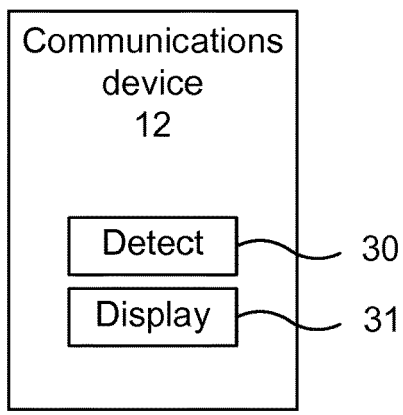
FIG. 9 illustrates a communications device according to another embodiment of the invention.

FIG. 9 illustrates a communications device 12 configured to manage a voice call having been queued to await a response by a human representative of a call centre according to an embodiment.

The communications device 12 comprises detecting means 30 adapted to detect, from a voice indication provided by the call centre, information indicating a current place of the voice call in the queue and displaying means 31 adapted to display, to a calling party, the detected information indicating a current place of the voice call in the queue.

The means 30, 31 may comprise a communications interface for receiving and providing information, and further a local storage for storing data, and may (in analogy with that previously discussed) be implemented by a processor embodied in the form of one or more microprocessors arranged to execute a computer program downloaded to a suitable storage medium associated with the microprocessor, such as a RAM, a Flash memory or a hard disk drive.

The aspects of the present disclosure have mainly been described above with reference to a few embodiments and examples thereof. However, as is readily appreciated by a person skilled in the art, other embodiments than the ones disclosed above are equally possible within the scope of the invention, as defined by the appended patent claims.

The invention claimed is:

1. A method of managing a voice call having been queued to await a response by a human representative of a recipient of the voice call, the method being performed by a communications device of a calling party and which comprises:
   detecting, from a voice indication provided by the recipient, information indicating a current position of the voice call in the queue;
   reducing a listening volume of the communications device as long as the voice call is in the queue such that the calling party does not hear the voice call;
   displaying the information indicating the current position of the voice call in the queue;
   determining whether the detected information indicating the current position of the voice call in the queue indicates that a queue threshold condition is satisfied or not; and
   in response to determining that the queue threshold condition is satisfied:
      increasing the listening volume of the communications device such that the calling party hears the voice call; and
      notifying the calling party.

2. The method according to claim 1, wherein the notifying the calling party in response to determining that the queue threshold condition is satisfied comprises at least one of displaying a visual alert, emitting an audible alert, and rendering a haptic alert.

3. The method of claim 1, the information indicating an actual current position of the voice call in the queue.

4. The method of claim 1, the information indicating a remaining time until the response by the human representative can be expected.

5. The method of claim 1, wherein the queue threshold condition is considered to be satisfied if the actual current position has decreased to a queue position threshold value.

6. The method of claim 1, wherein the queue threshold condition is considered to be satisfied if the remaining time until the response by the human representative can be expected has decreased to a queue time threshold value.

7. The method according to claim 1, wherein the detection of information from a voice indication comprises recognizing a non-human voice indication.

8. A computer program comprising computer-executable instructions for causing a communications device to perform steps recited in claim 1 when the computer-executable instructions are executed on a processing unit included in the communications device.

9. A computer program product comprising a non-transitory computer readable medium, the non-transitory computer readable medium having the computer program according to claim 8 embodied thereon.

10. A communications device configured to manage a voice call of a calling party having been queued to await a response by a human representative of a recipient of the voice call, the communications device comprising a processing unit and a memory, said memory containing instructions executable by said processing unit, whereby the communications device is operative to:
    detect, from a voice indication provided by the recipient, information indicating a current position of the voice call in the queue;
    reduce a listening volume of the communications device as long as the voice call is in the queue such that the calling party does not hear the voice call;
    display, the detected information indicating the current position of the voice call in the queue; and
    determining whether the detected information indicating the current position of the voice call in the queue indicates that a queue threshold condition is satisfied or not;
    in response to determining that the queue threshold condition is satisfied:
       increase the listening volume of the communications device such that the calling party hears the voice call; and
       notify the calling party.

11. The communications device of claim 10, wherein the notifying the calling party in response to determining that the queue threshold condition is satisfied comprises at last one of displaying a visual alert, emitting an audible alert, and rendering a haptic alert.

12. The communications device of claim 10, the information indicating an actual current position of the voice call in the queue.

13. The communications device of claim 10, the information indicating a remaining time until the response by the human representative can be expected.

14. The communications device of claim 10, wherein the queue threshold condition is considered to be satisfied if the actual current position has decreased to a queue position threshold value.

15. The communications device of claim 10, wherein the queue threshold condition is considered to be satisfied if the remaining time until the response by the human representative can be expected has decreased to a queue time threshold value.

16. The communications device according to claim 10, wherein the detection of information from a voice indication comprises recognizing a non-human voice indication.

\* \* \* \* \*